United States Patent [19]

Richter et al.

[11] Patent Number: 5,014,864
[45] Date of Patent: May 14, 1991

[54] CONVEYOR SYSTEM

[75] Inventors: Peter Richter; Josef Hafner; Rolf Schönenberger, all of Landsberg/Lech, Fed. Rep. of Germany

[73] Assignee: Veit Transpo GmbH, Fed. Rep. of Germany

[21] Appl. No.: 338,667

[22] Filed: Apr. 17, 1989

[30] Foreign Application Priority Data

Apr. 18, 1988 [EP] European Pat. Off. ............ 88106154

[51] Int. Cl.$^5$ .............................................. B65G 9/00
[52] U.S. Cl. .................................... 213/104; 213/101; 213/159; 105/3; 105/150; 104/93
[58] Field of Search ....................... 104/18, 93, 88, 89, 104/94, 95, 106, 111, 115, 172.4, 251, 253; 105/148, 150, 154.3, 155; 213/1 R, 75 R, 77, 100 R, 104, 159, 79, 84, 82, 88, 89, 90, 101, 100 W

[56] References Cited

U.S. PATENT DOCUMENTS

| 51,695 | 12/1865 | Clarke | 213/79 |
| 299,623 | 6/1884 | Comegys et al. | 213/82 |
| 456,987 | 8/1891 | Fontayne | 213/90 |
| 1,896,959 | 2/1933 | Kurtossy | 213/100 R |
| 1,912,249 | 5/1933 | Becker | 213/100 R |
| 4,627,545 | 12/1986 | Herbert et al. | 213/100 W |

Primary Examiner—Robert J. Oberleitner
Assistant Examiner—Mark T. Le
Attorney, Agent, or Firm—Finnegan, Henderson, Farabow, Garrett & Dunner

[57] ABSTRACT

A conveyor system, in particular a suspension conveyor system, comprising at least two transport units adapted to be moved on rollers and interconnected by a disconnectable coupling, the coupling including two identically formed hooks which are each provided with a hook opening, one of said hooks being arranged by an associated base member on one of the transport units to be coupled and the other hook being arranged by an associated base member on the other transport unit to be coupled in such a way that their hook openings face each other, each hook being loaded by a spring and being connected to its associated base member by means of a hub for rotation about an axis coinciding with a centerline of the hub, each hub forming a locking member by, in a coupled condition, being adapted to be engaged by the hook opening of the hook not associated with said transport unit while the hooks, in an uncoupled condition, being adapted to engage each other, and to be rotated by this engagement under tensioning of the spring, when the two transport units being moved towards each other, until each hook opening faces on hub in order to allow the spring to rotate the hook opening into a locking engagement with the hub.

23 Claims, 6 Drawing Sheets

CONVEYOR SYSTEM

DESCRIPTION

The present invention refers to a conveyor system, in particular a suspension conveyor system.

German-Offenlegungsschrift No. 33 18 381 discloses a suspension conveyor system with a coupling device of the type in question. Each coupling member of the known coupling device includes two hooks, the hook tips of which extend laterally around each other. The hooks are eccentrically arranged on the respective associated transport unit in such a way that, when two transport units to be coupled come into contact with each other along a straight line, the respective hooks associated therewith knock together on the outer surface located adjacent the hook tip. For effecting engagement and disengagement in the case of this position of the hooks, the transport units will have to be laterally displaced relative to each other, and this may sometimes be difficult in the case of transport units loaded to capacity. Furthermore, this known coupling device only functions in a reliable manner when the transport units are drawn. When they are pushed, the two hooks will move relative to each other in the direction of pushing until the summit of each hook on the base member knocks against the end face of the opposite transport unit. In this position, the hook tips will inevitably be spaced apart in the direction of transport, and a slight lateral displacement transversely to the direction of transport of one or of both transport units relative to each other will result in disengagement. Such a lateral displacement will, for example, already be caused when the transport units travel through a horizontal curve. Moreover, coupling of the known coupling device will no longer be possible if one of the hooks was damaged or broken into pieces as the result of a somewhat hard impact in the case of automatic coupling.

Hence, the present invention is based on the task of providing a conveyor system of the above-mentioned type, which, on the basis of a very simple structural design, will reliably function also in the case of thrust operation and when travelling through curves.

On the basis of the structural design according to the invention, a conveyor system is created, whose transport units need no longer be deflected from their position of transport for the purpose of coupling and uncoupling. Due to the special structural design of the coupling members, the transport units can also be pushed, without there being any risk of inadvertent disengagement of the coupling. Moreover, it will be possible to achieve at least a makeshift coupling even in cases in which one of the hooks is no longer in working order.

By means of the structural design according to a further development, the influence of the force of gravity on the engagement and disengagement operation can be eliminated. Moreover, on the basis of this structural design and on the basis of a further structural design the coupling is rendered symmetrical so that the transport units can be coupled independently of the respective direction, i.e. it is neither absolutely necessary that one of the two end faces of the transport unit constitutes the front end face nor is it absolutely necessary that one of the two end faces constitutes the rear end face.

A further development reduces the overall length of the coupling in the direction of transport, and this will have a positive effect in particular when the arrangement is travelling through curves.

The hooks can automatically be caused to assume the coupled condition, when the transport units knock together, and can be disconnected in a simple and expedient manner, while the disconnecting operation can be rendered automatic.

Two transport units can be coupled even in cases in which their center lines are laterally or vertically displaced relative to each other.

Suitable play in the system improves the curve-going properties in horizontal and vertical curves. Moreover, a play also facilitates a manual start, since the static friction of one transport unit first has to be overcome before the subsequent transport unit coupled thereto has to be drawn.

The beginning and the end of a transport train consisting of individual transport units can be defined by providing a locking position of one of the coupling members so that inadvertent coupling of other transport units is excluded—even if the coupling member of said other transport unit should be in a condition permitting a coupling operation.

The coupling members can be produced as injection moulded parts in a comparatively simple and economy-priced manner. Moreover, a certain inherent elasticity of the parts is achieved, which helps to avoid fractures on the one hand and which, on the other hand, also guarantees a perfect function, e.g. for forming the locking position.

One example of the present invention will be described in detail hereinbelow on the basis of the drawings, in which.

Figure 1:
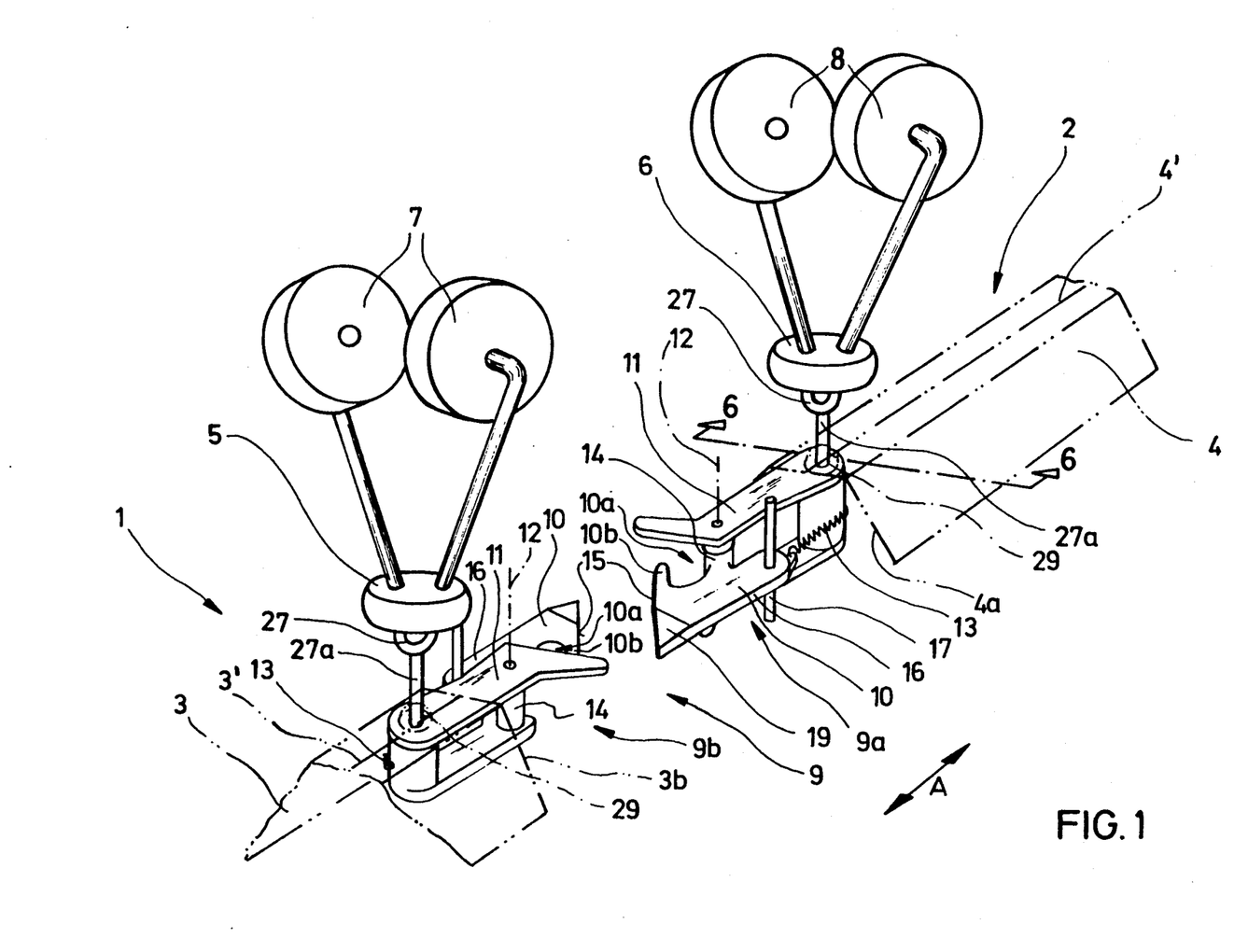
FIG. 1 shows a perspective, schematic representation of two transport units of the conveyor system according to the invention, the coupling members of said transport units being disposed in opposite relationship with each other.

FIG. 1 shows the ends of two transport units 1 and 2 of the type used, for example, for suspension conveyor systems. The transport units 1, 2 are normally provided with a cross arm 3, 4, said cross arms being only indicated by a dot-and-dash line for the sake of clarity. The cross arms 3 or 4 can, as shown, consist of a rail member which has a trapezoid profile and from which the objects to be transported are suspended. Both ends of the cross arms 3 and 4 are provided with an operating means; among these operating means, only the operating means 5 and 6 are shown, which are arranged in the vicinity of the cross arm end faces facing each other, i.e. in the case of an assumed direction of transport to the left in FIG. 1 they are arranged at the rear end face 3b of the cross arm 3 and at the front end face 4a of the cross arm 4. Each of the operating means 5, 6 is provided with a pair of rollers 7, 8, which are adapted to be pushed onto a roller rail 31 in the conventional manner (cf. FIG. 6) and which are adapted to roll along said rail, the operating means being centrally suspended therefrom.

A coupling 9, which consists of two identically constructed coupling members 9a and 9b, is provided between the cross arm end faces 3b and 4a facing each other. Identically constructed coupling members are also provided on the front end face of the cross arm 3 and on the rear end face of the cross arm 4, said end faces being not shown in FIG. 1. When the end faces of the cross arms 3, 4 are viewed in plan, all coupling members are arranged identically relative to a fixed point, which is defined in FIG. 1 e.g. by longitudinal centre lines 3' and 4' through the roof parts of the cross arms 3 and 4.

Figure 2:
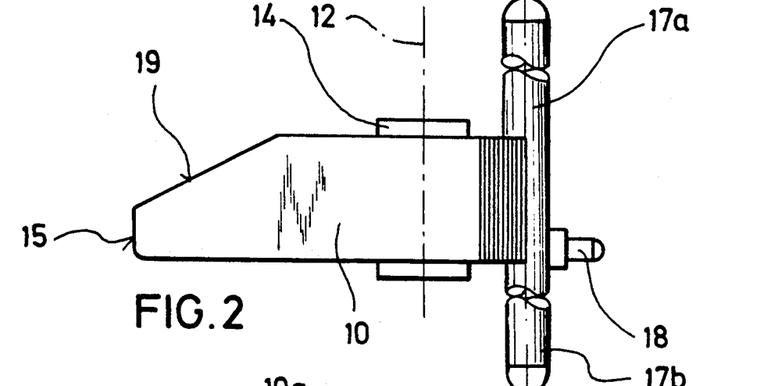
FIG. 2 shows a side view of the hook of the coupling according to FIG. 1.
Figure 3:
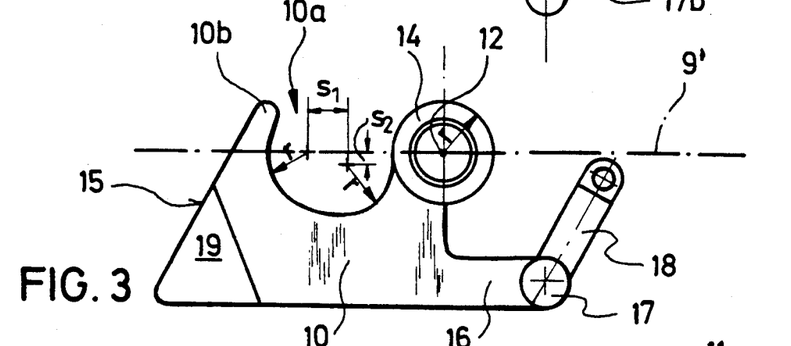
FIG. 3 shows a top view of FIG. 2.
Figure 4:
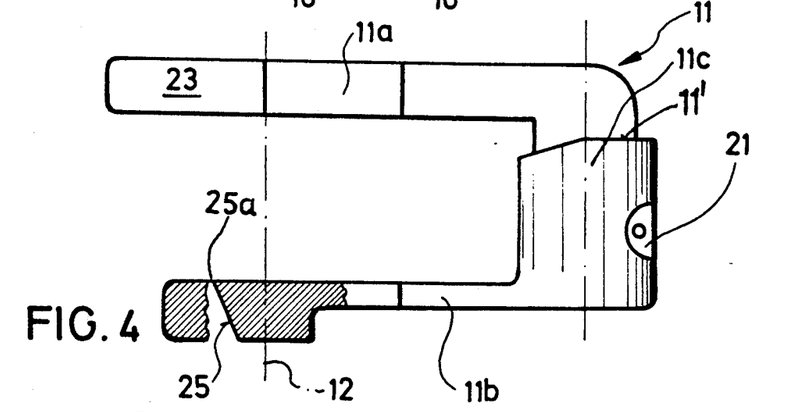
FIG. 4 shows a side view of the base member of the coupling according to FIG. 1.
Figure 5:
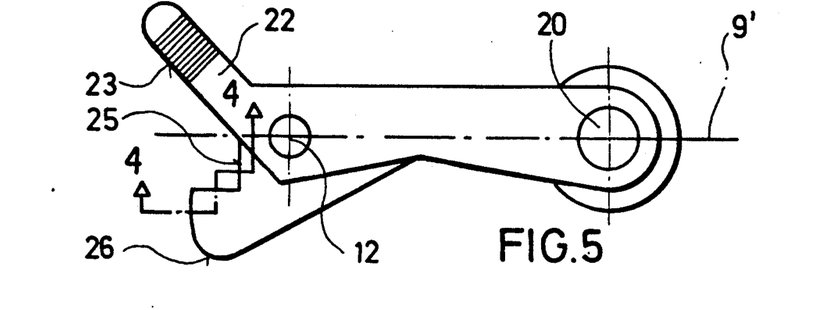
FIG. 5 shows a top view of FIG. 4.

Each coupling member 9a, 9b is provided with the same hook 10 shown in detail in FIG. 2 and 3 and with the same base member 11 shown in detail in FIG. 4 and 5. The hooks 10 of the coupling members 9a and 9b, respectively, of a coupling 9 are arranged such that their hook openings 10a are directed sidewards and are arranged in opposite relationship with each other. It follows that, in combination with the above-described arrangement with regard to the cross arms, the coupling 9 is symmetrical, i.e. that the transport unit 2 can, for example, be coupled to the transport unit 1 even in cases in which the not-shown rear end face of the cross arm 4 is arranged in opposite relationship with the end face 3b.

The hook 10 is adapted to be rotated about an axis of rotation 12 against the force of a spring 13. On the side of the axis of rotation 12 facing away from the end faces 3b and 4a, respectively, the hook opening 10a is delimited by a hook tip 10b and on the other side it is delimited by a hub 14 extending coaxially with the axis of rotation 12. The hub 14 of the coupling member 9a forms a locking member for the hook opening 10a of the coupling member 9b and the hub 14 of the coupling member 9b forms a locking member for the hook opening 10a of the coupling member 9a. The end face of each hook 10 has provided thereon a substantially vertical contacting surface 15, which extends from the hook tip 10b in the vicinity of the associated cross arm 3 and 4, respectively, forwards at an oblique angle towards the other, non-associated cross arm 4 and 3, respectively.

On the side of the axis of rotation 12 facing away from the hook opening 10a and facing the respective associated cross arm 3 and 4, respectively, each hook is provided with a release lever 16 with the aid of which the hook can be pivoted for disengaging the coupling.

For the purpose of effecting automatic disengagement, each release lever 16 is provided with an actuating member 17 constructed as a pin extending with an upper extension 17a upwards beyond the hook 10 and with a lower extension 17b downwards beyond the hook 10. The functions of the actuating member 17 will be explained in detail hereinbelow. The release lever 16 has additionally provided thereon a holding web 18, which is directed inwards at an oblique angle and which has attached thereto one end of the spring 13.

The hook 10 is additionally provided with a forwardly descending guide surface 19, which is provided in the hook area projecting farthest towards the neighbouring cross arm 3 and 4, respectively.

As can be seen from FIG. 1 and 3, the hook opening 10a has a substantially U-shaped structural design and is provided with two rounded portions at the bottom thereof. The radii r of the rounded portions are identical among one another and are identical with the radius r of the outer circumferential surface of the hub 14. The centres of the rounded portions of the hook opening 10a are located one behind the other at a distance $s_1$ in the direction of transport, said direction of transport being—for the purpose of representation—indicated by a centre line 9' extending through the axis of rotation 12. The centre of the rounded portion facing the hook tip 10b will then lie on this centre line 9'. The centre of the rounded portion facing the hub 14 can, as shown, be located deeper inside the hook opening 10a at a distance $s_2$ from the first-mentioned centre perpendicular to the centre line 9' or it can be located on said centre line 9' as well. As can especially be seen from FIG. 2, the hub 14 projects beyond the hook 10 on the upper as well as on the lower side thereof.

As can be seen from FIG. 1, 4 and 5, the base member 11 is provided with a fork-shaped structural design and encloses the hook 10 from above with an upper web 11a and from below with a lower web 11b, said webs being interconnected by a rear connection member 11c. The distance between the webs 11a, 11b is larger than the height of the hook 10. The connection member 11c has provided therein a hole 20 for securing the base member 11 to the associated cross arms 3 and 4, respectively, and an articulation point 21 for the other end of the spring 13. The axis of rotation 12 is arranged, in the form of a pin, in the free ends of the upper and lower webs 11a and 11b, respectively, facing away from the connection member 11c, said axis of rotation 12 as well as the centre of the hole 20 being located on the centre line 9'. The upper web 11a has in the front area thereof an extension web 22 carrying an essentially vertical guide surface 23 at its side facing forwards. The guide surface 23 extends from the centre line 9' at an oblique angle forwards and to the side and towards the rear it is extended by a certain length beyond the centre line 9'. The edge abutting on the guide surface 23 and facing the lower web 11b and the underside of the extension web 22 are constructed as a stop surface 24.

An additional stop surface 25 is provided in the front area of the lower web 11b. As can be seen from the section IV—IV of FIG. 5, which is shown in FIG. 4, the stop surface 25 extends downwards towards the rear, an acute-angle edge 25a being thus formed at the upper side of the lower web 11b facing the hook 10. The lower web 11b additionally includes a locking cam 26 whose crown surface is located at a distance from the axis of rotation 12 which is slightly larger than the distance between said axis of rotation and the inner surface of the lower extension 17b of the actuating member 17, said inner surface facing the hub 14, so that said actuating member has to be guided over the summit of the locking cam 26 while effecting a locking engagement.

Figure 6:
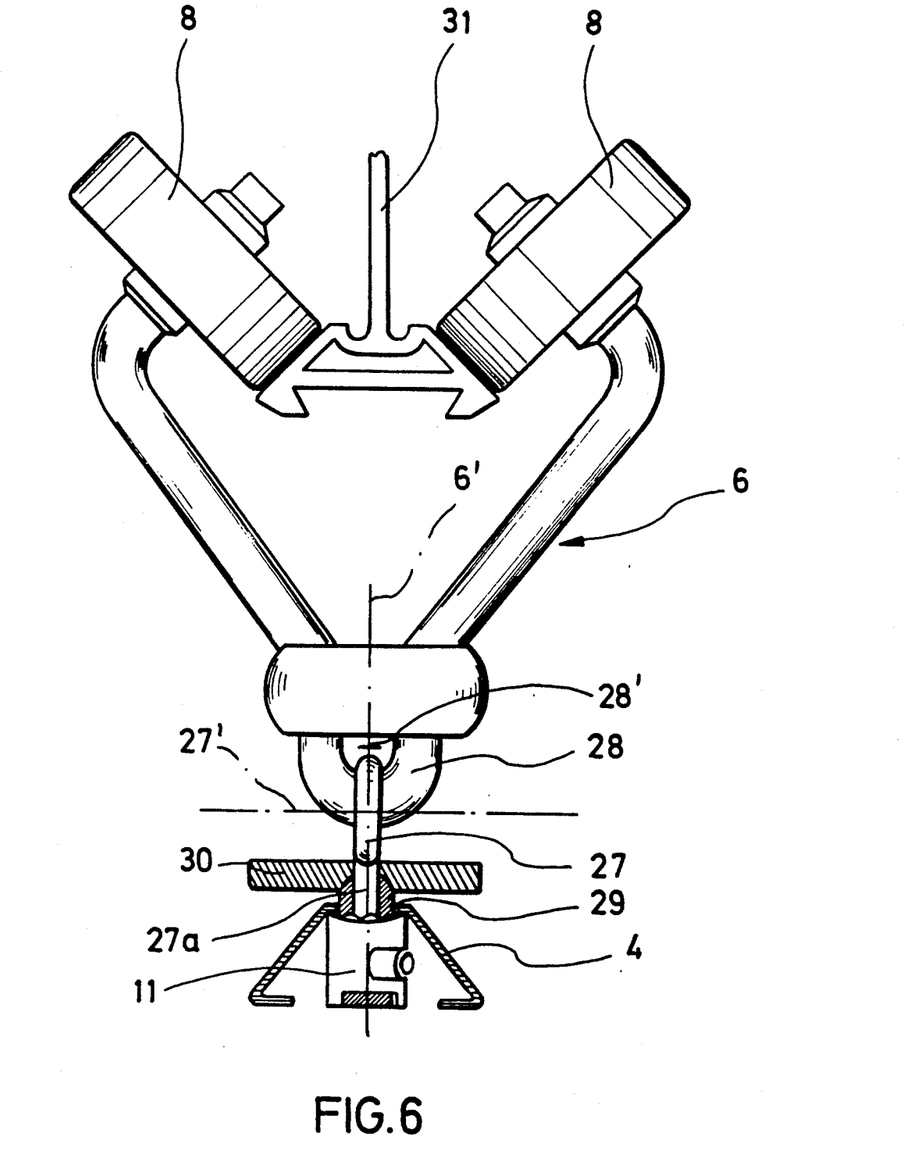
FIG. 6 shows a cross-section along VI—VI of FIG. 1 plus an operating means attached thereto.

As can be seen from FIG. 1 and 6, the base member 11 is rigidly connected with a fastening lug 27 whose shaft 27a is preferably screwed into the hole 20 or passed through said hole and secured by a counternut. The fastening lug 27 has its lug opening arranged in such a way that a centre axis 27' extending through the lug opening 27 extends essentially at right angles to the centre line 9' of the coupling members 9a and 9b, respectively. The fastening lug 27 is engaged by a lug 28 arranged on the operating means 5 and 6, respectively. The dimensions of the lugs 27 and 28 are coordinated such that the operating means 5 and 6, respectively, can rotate about the centre axis 27' of the lug opening of the fastening lug 27 as well as about a centre axis 28' of the lug 28 extending parallel to the centre line 9'. The interior diameter and the shape of the fastening lug 27 as well as the thickness of material and the shape of the ring defining the lug 28 are, however, coordinated such that, with the exception of a very small amount of play, the operating means 5 and 6, respectively, are secured against rotational displacement about the axis of symmetry 6' of the operating means.

Between the base member 11 and the fastening lug 27, the cross arms 3 and 4, respectively, rest on a shoulder surface 11' of the base member 11 in a substantially loose manner, the shaft 27a extending through an opening 29 in the cross arm 3, 4. Within said opening 29, the shaft 27a with the base member 11 and, when the above-described amount of play has been overcome, also the rollers 7 and 8 together with the operating means 5 and 6, respectively, can freely rotate about the axis 6' relative to the cross arms 3 and 4, respectively. The shaft 27a of the fastening lug 27 additionally secures in position a buffer member 30, which serves as a stop means for holding devices, which are arranged on the cross arms 3 and 4, respectively, and which are used for the objects to be transported.

It will be expdient when one of the webs 11a, 11b, preferably the upper web 11a, of the base member 11 is narrower than the opening 29 so that the base member 11 can be produced as an integral part 11. When carrying out the mounting operation, the narrow web of the base member 11 will first be passed through the opening 29 without any hooks 14 being attached to the base member. Subsequently, the fastening lug 27, which has already been arranged on the operating means 5 and 6, respectively, will be screwed into the base member 11 at 20, and said fastening lug 27 will simultaneously fasten the buffer member 30 in such a way that the cross arm 3, 4 can tilt between the shoulder surface 11' and the buffer member 30. Following this, the hook 14 will be anchored in the base member 11 with the aid of the pin serving as an axis of rotation 12 and the spring 13 will be attached.

Figure 7:
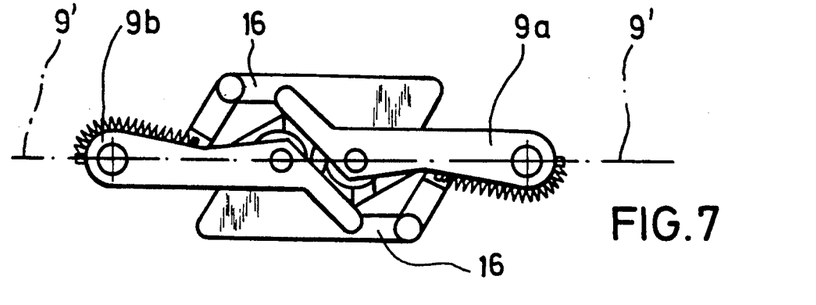
FIG. 7 shows a coupling in the coupled condition.
Figure 8:
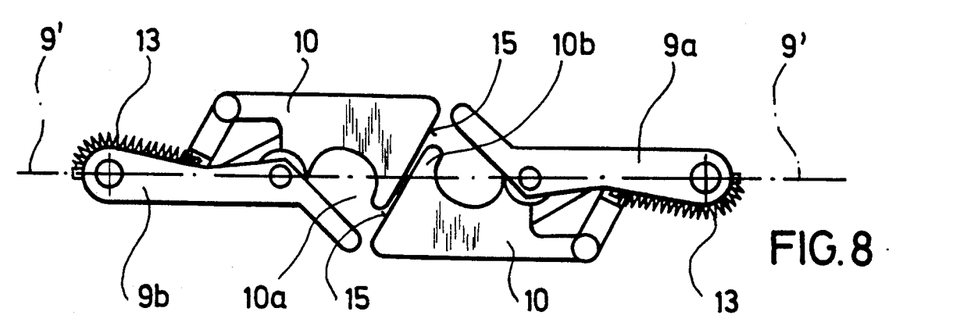
FIG. 8 shows two coupling members of a coupling in a central position prior to engagement.

In the following, engagement and disengagement of the coupling 9 of the conveyor system according to the invention will be described:

When the two transport units 1 and 2, which are shown in FIG. 1, are moved towards each other in the direction of the arrow A—the centre lines 9' of the two coupling members 9a and 9b, respectively, being in alignment with each other under ideal circumstances—the contacting surfaces 15 on the end faces of the two hooks 10 will knock together in the way shown in FIG. 8. The contacting surfaces 15 of the two hooks slide against each other, causing the hooks, with the hook tips 10b being directed outwards, to rotate about their respective axes of rotation 12 against the force of the spring 13. The hook tips 10b will thus first move around each other, contact the hub 14 of the opposite coupling member 9a and 9b, respectively, whereupon they are again deflected and then engage behind the respective opposite hub so that these hubs will be positioned in the interior of the hook openings 10a. This coupled condition is shown in FIG. 7.

Figure 9:
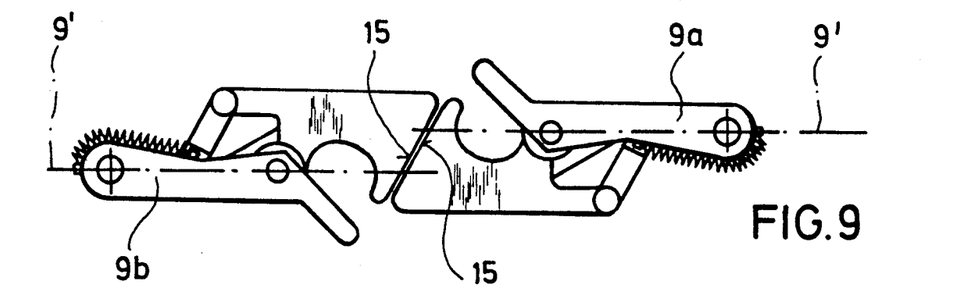
FIG. 9 shows two coupling members prior to engagement, said coupling members being laterally displaced relative to each other in one direction.

FIG. 9 shows the initial condition when coupling is effected in cases in which the centre lines 9' of the two coupling members 9a and 9b, respectively, are horizontally displaced relative to each other; such a horizontal displacement can easily occur in practical operation, e.g. due to non-uniform loading. Within a specific range of lateral displacement, the contacting surfaces 15—even in the case of such a displacement—still knock together in the above-described manner to such an extent that the deflected coupling member is forced back into the correctly aligned position of its centre line 9', whereupon the coupling operation can take place in the manner described.

Figure 10:
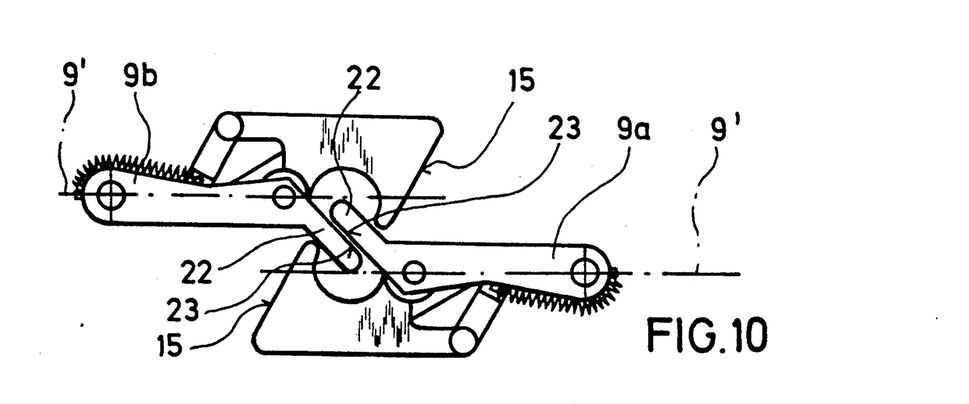
FIG. 10 shows two coupling members prior to engagement, said coupling members being laterally displaced in the other direction.

In FIG. 10, one of the two coupling members is deflected towards the other side to such an extent that the contacting surfaces 15 can no longer come into contact with each other. In this case, the transport units move towards each other still further until the guide surfaces 23, which are provided on the extension webs 22 of both coupling members 9a, 9b and which are located behind the contacting surfaces 15 when seen in the direction of movement, contact each other. This has the effect that the deflected coupling member is forced back into correct alignment of the two centre lines 9' relative to each other, the arrangement of the guide surfaces 23—relatively seen—behind the contacting surfaces 15 having the effect that each of the hook tips 10b will immediately knock against the hub 14 of the counterpart, will be deflected by said hub and fall back into the coupled position.

Figure 11:
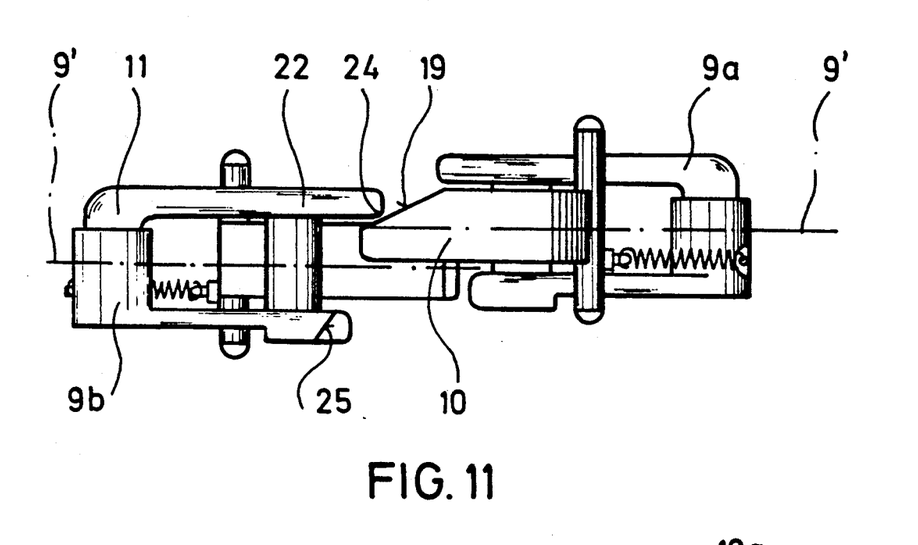
FIG. 11 shows two coupling members prior to engagement, said coupling members being vertically displaced relative to each other.

When, as shown in FIG. 11, both centre lines 9' are displaced in the vertical and perhaps additionally also in the horizontal direction, the guide surface 19 of the coupling member 9a positioned on a higher level comes, during the coupling operation, into engagement with the stop surface or stop edge 24 on the extension web 22 of the base member 11 of the coupling member 9b positioned on a lower level. By means of the oblique guide surface 19, the coupling member positioned on a higher level is drawn downwards and the coupling member positioned on a lower level is drawn upwards so that their centre lines 9' are brought into alignment with each other and so that the coupling operation can be carried out in the manner described. In cases in which a horizontal displacement exists as well, one of the correcting movements described in FIGS. 9 and 10, respectively, will additionally be carried out, if necessary.

For manually releasing the coupling, it will be sufficient to press the release levers 16 (FIG. 7) with two fingers of one hand and to give one of the transport units a slight push at the same time.

Figures 13, 14, 15:
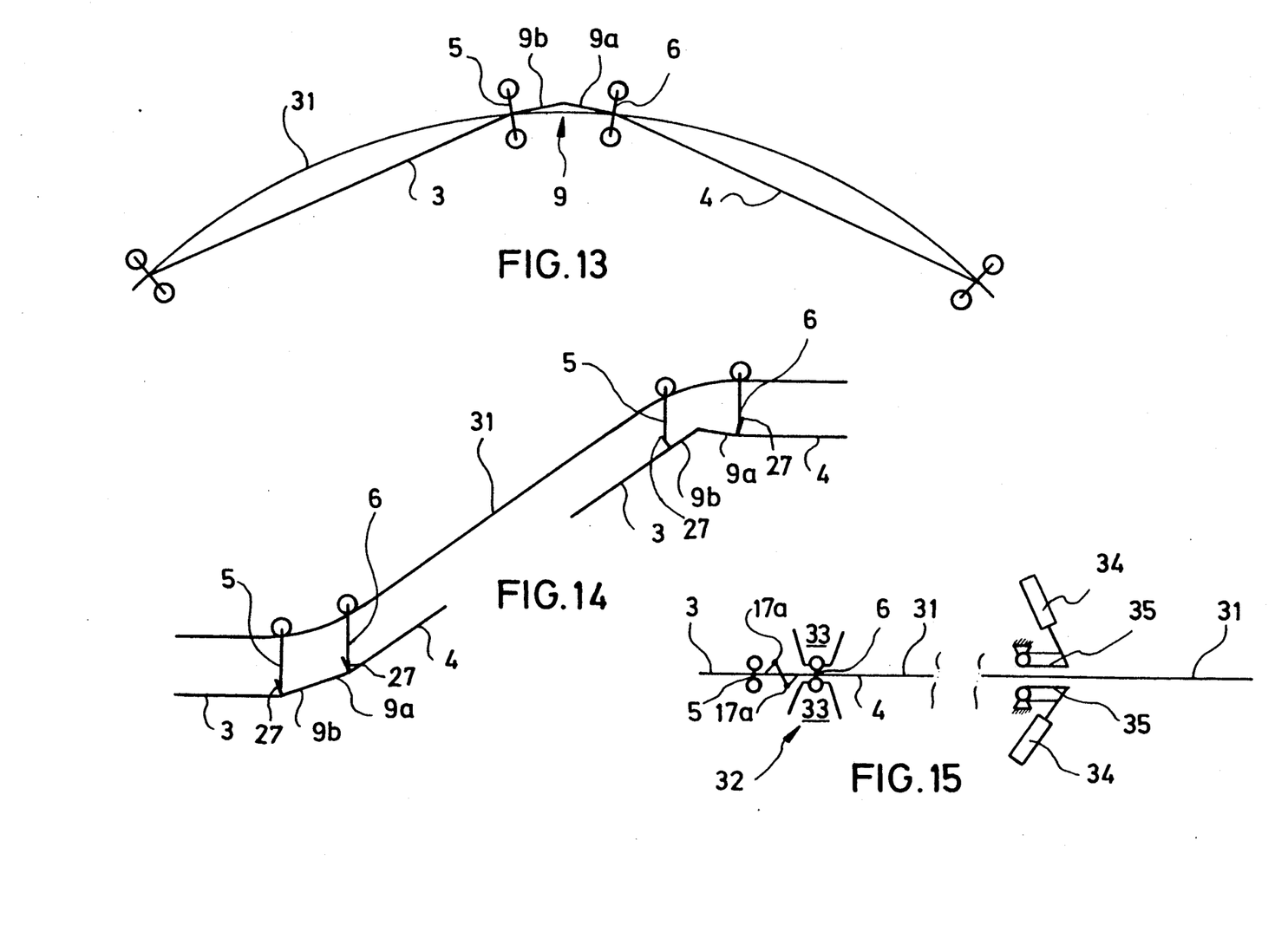
FIG. 13 shows a schematic representation of the conveyor system travelling through horizontal curves.
FIG. 14 shows a schematic representation of the conveyor system travelling through vertical curves.
FIG. 15 shows a schematic representation of a disconnecting device.

If automatic uncoupling is to be effected at a predetermined location in a rail path, a forced guide means 32, e.g. for the upper extension 17a of the actuating member 17, can be provided, as shown in FIG. 15, at this location, said forced guide means causing the actuating member 17 to move in the direction of the centre line 9' of the associated coupling member 9a or 9b. Such a forced guide means can, for example, consist of cams 33 projecting into the path of the actuating member 17 on both sides of the coupling 9. After the location of uncoupling, a gentle slope could be provided so that each train of transport units passing the cams 33 is uncoupled and so that the uncoupled transport units are set apart from one another at the same time. If not every train passing the location of uncoupling is to be uncoupled, a possibility offering itself would, for example, be pivotably supported cams 35, which are adapted to be controlled by an actuating piston 34 and which can be pivoted into the path of the actuating members 17 and withdrawn from said path, as required.

Figure 12:
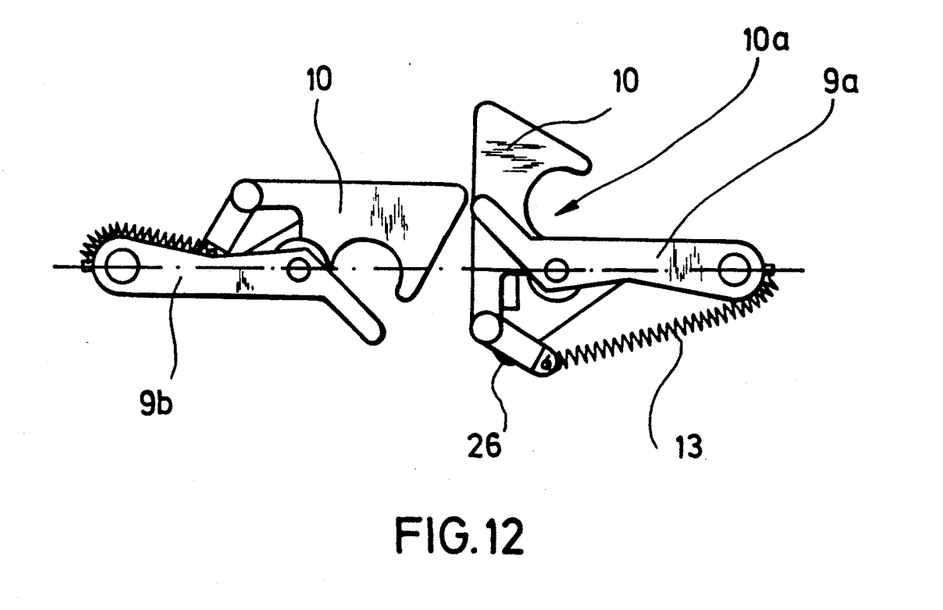
FIG. 12 shows two coupling members which are not adapted to be coupled.

In order to avoid inadvertent coupling of two transport units positioned on the rail path, one of the coupling members 9a facing each other can be pivoted into the locking position shown in FIG. 12. For this purpose, the hook 10 is rotated about its axis of rotation 12 against the force of the spring 13 to such an extent that the lower extension 17b of the actuating member 17 is guided over the locking cam 26 (cf. also FIG. 5). In this connection, either the locking cam 26 or the lower extension 17b of the actuating member 17 can be resilient so that such a movement is possible. Behind the locking cam 26, the lower extension 17b comes to a standstill on a surface located at a distance from the axis of rotation 12 which is smaller than the distance between the axis of rotation and the locking cam. In this locking position, the hook opening 10a is directed towards the associated cross arm in a manner which does not permit coupling and the hub thereof is thus blocked against engagement with the other hook opening. Even if the opposite coupling member 9b is still located in a position permitting coupling, a coupling operation can still not take place, since the hook 10 of the coupling member 9b knocks against the back of the hook 10 of the coupling member 9a in vain.

The following is a further description of various operating conditions of the conveyor system according to the present invention:

as can be seen from FIG. 7, the two guide surfaces 23 of the extension webs 22 are, in the coupled condition, spaced apart by a distance extending parallel to the centre line 9'. The same applies to the non-visible edges 25a of the contacting surfaces 25. Moreover, it can be seen from FIG. 3 that the hubs 14 in the opposite hook openings 10a are received in said openings with an amount of play in the direction of the centre line 9' which corresponds to the distance $s_1$. This has the effect that, in the coupled condition, a rectilinear relative play in the direction of the centre lines 9' exists between the coupling members 9a and 9b. This relative play serves to reduce the accelerating force which has to be applied when a train consisting of several transport units is started. This will be advantageous especially in connection with suspension conveyor systems in the case of which a train has to be moved by hand as well. Due to the amount of play, the static friction of the first transport unit is first overcome before the next one of the transport units coupled thereto has to be set in motion, etc. The above-described amount of play is overcome when a thrust force is applied because the edges 25a of the contacting surfaces 25 as well as the guide surfaces 23 and also the hubs 14 of the two coupling members come into contact with one another and guarantee a linear transmission of force in the direction of the centre line 9' also when a thrust force is applied. Within the train the conveying force is transmitted by means of the hook tips engaging the respective opposite hubs.

The above-described amount of play in the direction of the centre line 9' and the fact that the hook 10 is lower than the interspace between the upper and the lower web 11a, 11b of the base member additionally provide a limited amount of tilting play permitting a tilting movement of the two coupling members 9a, 9b relative to each other in a vertical plane, the two centre lines 9' of the two coupling members 9a, 9b enclosing a vertical angle in this case. In order to facilitate tilting, the stop surface 25 is bevelled, as can be seen in FIG. 4.

Due to the distance $s_1$ shown in FIG. 3, also a horizontal pivotal play is provided between the two coupling members 9a, 9b, said play permitting a pivotal movement of the two coupling members 9a, 9b in a horizontal plane, the two centre lines 9' enclosing a horizontal angle in this case.

Together with the substantially rigid connection between the base member 11 and the rollers of the operating means, which is described on the basis of FIG. 6, the pivotal play and the tilting play serve to improve the curve-going properties. When travelling through horizontal curves according to FIG. 13, the axes of rotation of the rollers of the operating means endeavour to position themselves radially relative to the centre of the respective curve. In view of the fact that only a loose connection exists between the rollers and the cross arm via the opening 29, the rollers will easily be able to position themselves in the above-mentioned direction by means of a relative rotation of the rollers and of the base member about the axis 6' relative to the cross arm, whereas the cross arms assume such a position that they define chords through the curves. Assuming first that no play is provided between the coupling members, the coupling 9 will endeavour to assume, with aligned centre lines 9', a position in which it also defines a chord through the curve, the centre lines 9' enclosing then an angle with the centre lines 3' and 4', respectively. The chord, which extends between the two operating means and which is defined by the coupling 9, is, however, shorter than the cross arms so that the advantages of the embodiment according to the present invention in comparison with the prior art become already evident in this connection. In particular, the coupled cross arms have a substantially larger distance in the lateral direction so that e.g. coat hangers are prevented from knocking together even in narrow curves. Moreover, due to the above-described small amount of play between the lugs 27 and 28, the operating means can rotate slightly about the vertical axis of symmetry 6' relative to the coupling member so that, in the case of normal curve radii, the orientation of the rollers which can thus be achieved will be sufficient for permitting jolt-free travelling through the curves. The curve-going properties are improved even further by the above-described pivotal play of the two coupling members 9a, 9b in the horizontal direction by means of which the rollers are provided with a further possibility of moving such that they can orientate themselves radially relative to the centre of the curve. These orientation possibilities of the rollers of the operation means exist when a tractive force is applied and also when a thrust force is applied, since the hook openings engaging around the respective opposite axis of rotation permit only the pivotal play predetermined by the distance $s_1$, whereas they act rigidly in all other respects.

An undesirable deflection movement caused by thrust in the second joint between the base member and the associated cross arm is prevented by the substantially rigid connection between the base member and the rollers of the operating means, said rollers being, in turn, subjected to forced guiding by the roller rail.

When travelling through vertical curves according to FIG. 14, a lengthening of the coupling is required upon changing from a straight to an ascent or from a descent to a straight for equalizing thus the enlarged travelling radius of the coupling relative to the rollers. This is achieved in that the cross arm assumes a position in which it defines a chord through the curve, the lug 28 of the operating means rotating about the axis 27' of the fastening lug 27 on the operating means. In the area of the coupling, the amount of radial play shown in FIG. 7 can fully be utilized for the purpose of lengthening the coupling 9. Due to the only loose connection with the cross arm, also the base member 11 together with the fastening lug 27 can tilt about the axis 27' relative to the cross arm. It is thus possible that the operating means travel through the curve in an approximately vertically suspended condition, and this will prevent jamming of the rollers and, consequently, a jolty transport movement.

Upon changing from an ascent to a straight or from a straight to a descent, the necessary reduction of the length of the distance to be travelled is achieved in that the cross arm assumes a position in which it defines a chord on the curve, whereas the operating means are rotated about the axis 27'. In the area of the coupling, the play existing in the direction of transport between the coupling members 9a and 9b is eliminated by moving said coupling members towards each other until they knock together especially on the contacting surfaces 25, both coupling members 9a, 9b being thus tilted relative to each other so that their centre lines 9' enclose a vertical angle between them. The tilting movement is facilitated by the bevelled contacting surface 25. In addition, the above-described tilting of the base members relative to the cross arm is possible as well. This permits a substantially jolt-free travelling through curves also in the case of such vertical curves.

These explanations show clearly that the conveyor system according to the present invention will behave in substantially the same manner when travelling through curves in thrust operation and when travelling through curves in tractive operation. Due to the coupling member hooks engaging the hub on the respective other side, the coupling has a self-stabilizing effect, i.e. the formation of bends in thrust operation is counterbalanced by a torque. This effect is maintained by providing an expedient amount of play. For example, in the case of a preferred embodiment for use with a suspension conveyor system in textile factories a longitudinal play of approximately 3 mm was provided, and the height of the hook to the distance between the webs of the base member was dimensioned such that the tilting movement given by said longitudinal play can fully be utilized. A value of 1 mm was chosen for the distance $s_2$. Due to the play existing within the coupling, it should be possible to achieve a horizontal pivotability between the two centre lines 9' by approx. 13° in both directions. Between the lug of the operating means and the fastening lug of the base member such an amount of play is provided that each operating means is adapted to be rotated about its axis of symmetry by approx. 0.5° in both directions. Hence, a maximum bend-formation ability of approx. 14° is obtained in the area of the coupling. However, these dimensions can, of course, be adapted to the requirements of the individual conveyor system.

The radii of vertical curves are approx. 1,000 mm. Ascents of approx. 50% can be passed.

The base member and the hooks of the coupling are injection moulded from a plastic material having the necessary elasticity and resitivity to the impact of the coupling members on each other. The plastic material used is preferably polyethylene or polyoxymethylene (POM).

When the embodiment described and shown hereinbefore is modified, the present invention can be used not only in a suspension conveyor system but also in other conveyor systems. In cases in which symmetry of the coupling is not required, the hooks can also be arranged such that they are directed towards each other in the vertical direction. It is also possible that the hooks engage locking members which are provided on the opposite coupling member and which are arranged remote from the hub.

We claim:

1. An overhead conveyor system comprising at least two transport units having free ends and being adapted to be moved on rollers and interconnected by a disconnectable coupling, said rollers being rotatably supported by operating means adjacent said free ends, the coupling including two identically formed hooks which are each provided with a hook opening, one of said hooks being arranged by an associated base member on a free end of one of the transport units to be coupled and the other hook being arranged by an associated base member on a free end of the other transport unit to be coupled in such a way that their hook openings face each other, each hook being loaded by a spring and being connected to its associated base member by means of a hub for rotation about an axis coinciding with a centerline of the hub, each hub forming a locking member by, in a coupled condition, being adapted to be engaged by the hook opening of the other hook, while the hooks, in an uncoupled condition, being adapted to engage each other, and to be rotated by this engagement under tensioning of the spring, when the two transport units are moved towards each other, until each hook opening faces one hub in order to allow the spring to rotate the hook opening into a locking engagement with the hub, each of said base members being connected to a cross arm of the associated transport unit through a second, essentially vertical axis of rotation characterized in that said base member and the operating means arranged adjacent said base member at the same free end are adapted to pivot relative to one another about a substantially horizontal axis extending transversely to the direction of the transport.

2. A conveyor system according to claim 1, characterized in that the axis of rotation about said hub extends essentially vertical.

3. A conveyor system according to claim 2, characterized in that the axes of rotation of said hooks are arranged identically with respect to a centre line of the associated transport units.

4. A conveyor system according to claim 1, characterized in that each hook is adapted to be moved to a locking position.

5. A conveyor system according to claim 4, characterized in that the locking position is defined by a locking engagement between one of the hooks and a locking cam on one of the base members.

6. A conveyor system according to claim 1, characterized in that each hook is provided with a contacting surface extending from the hook opening obliquely towards the adjacent transport unit, the contacting surfaces of both hooks of said disconnectable coupling being adapted to be brought into engagement with each other for rotating the hooks.

7. A conveyor system according to claim 1, characterized in that each hook is provided with a release lever for disconnecting the coupling, said release lever being arranged on the side of the axis of rotation facing away from the hook opening.

8. A conveyor system according to claim 7, characterized in that the release lever is provided with an actuating member for engagement with a guide means adapted to be passed by the coupling and used for effecting automatic disconnection of the coupling.

9. A conveyor system according to one of the claims 7 or 8, characterized in that the release lever for automatically disconnecting the coupling is adapted to be controlled by a decoupling device.

10. A conveyor system according to claim 1, characterized in that each hook has associated therewith a first guide surface extending away from the hook and at an oblique angle towards the other transport unit, the first guide surface of both hooks of a coupling being adapted to be brought into engagement with each other during a coupling operation so as to equalize horizontal displacements.

11. A conveyor system according to claim 10, characterized in that each hook has associated therewith a first stop surface, the stop surfaces of both hooks of a coupling being adapted to be brought into engagement with each other so as to limit their relative movement in the direction of transport.

12. A conveyor system according to claim 11, characterized in that each hook has associated therewith a second guide surface and a second stop surface which are vertically spaced apart, that at least the second guide surface is inclined relative to a horizontal plane, the second guide surface of a hook being adapted to be brought into engagement with the second stop surface of the other hook during the coupling operation so as to equalize vertical displacements of the two hooks of a coupling relative to each other.

13. A conveyor system according to claim 11 characterized in that the first stop surface is arranged on the base member.

14. A conveyor system according to claim 12 characterized in that the second stop surface is arranged on the base member.

15. A conveyor system according to claim 1, characterized in that each hook opening engages the locking member with a certain amount of play in the direction of transport.

16. A conveyor system according to claim 1, characterized in that each hook opening engages the locking member with a certain amount of tilting play in a substantially vertical plane.

17. A conveyor system according to claim 1, characterized in that each hook opening engages the locking member with a certain amount of pivotal play in a substantially horizontal plane.

18. A conveyor system according to claim 1, characterized in that the rollers located adjacent each hook are rigidly connected to the base member in so far as, with the exception of a certain amount of play, they can be rotated about the second axis of rotation only together with the base member.

19. A conveyor system according to claim 1, characterized in that the base member encloses the hook in a fork-shaped configuration with an upper web and a lower web.

20. A conveyor system according to claim 19, characterized in that the second vertical axis of rotation is a shaft of a fastening lug, said shaft being fixedly connected to the base member and said fastening lug being engaged by a lug connected to the rollers, said shaft extending through an opening in the cross arm.

21. A conveyor system according to claim 20, characterized in that one of the webs of the base member is narrower than the opening.

22. A conveyor system according to claim 1, characterized in that the hook and the base member consist of plastic material.

23. A conveyor system according to claim 10 characterized in that the first guide surface is arranged on the base member.

* * * * *